Figure 1:
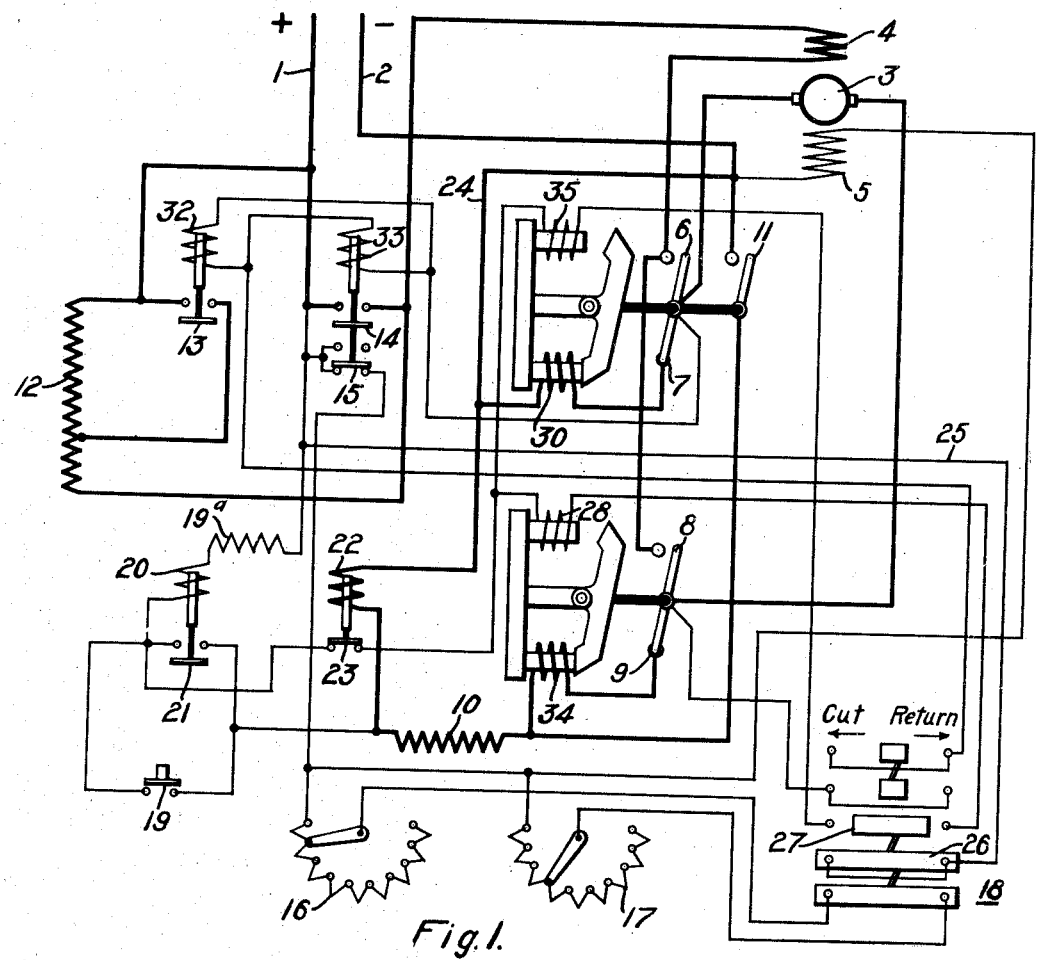

E. I. DEUTSCH.
MOTOR CONTROL SYSTEM.
APPLICATION FILED JUNE 13, 1917.

1,308,229.

Patented July 1, 1919.

WITNESSES:
R. J. Fitzgerald.
J. R. Langley.

INVENTOR
Edward I. Deutsch.
BY
Cleesley G. Carr.
ATTORNEY

UNITED STATES PATENT OFFICE.

EDWARD I. DEUTSCH, OF CINCINNATI, OHIO, ASSIGNOR TO WESTINGHOUSE ELECTRIC & MANUFACTURING COMPANY, A CORPORATION OF PENNSYLVANIA.

MOTOR-CONTROL SYSTEM.

1,308,229.   Specification of Letters Patent.   Patented July 1, 1919.

Application filed June 13, 1917. Serial No. 174,475.

*To all whom it may concern:*

Be it known that I, EDWARD I. DEUTSCH, a citizen of the United States, and a resident of Cincinnati, in the county of Hamilton and State of Ohio, have invented a new and useful Improvement in Motor-Control Systems, of which the following is a specification.

My invention relates to motor-control systems and it has particular relation to such systems as are employed in connection with electric motors for driving planers or other reciprocating machine tools.

My invention has for its object to provide a simple and efficient arrangement for effecting the operation of the motor in opposite directions for the respective operations and for effecting the dynamic braking of the motor during the latter portion of its operation in each direction.

It has been proposed, heretofore, to complete a dynamic braking circuit for the motor armature through the reversing switches when the latter occupy their normal positions. A braking resistor, which is included in the armature circuit, is normally shunted by an electromagnetically operable switch that is arranged to open immediately prior to the completion of the dynamic braking circuit.

This arrangement possesses the disadvantage that the switch for controlling the shunt circuit for the dynamic braking resistor must open before the braking circuit is closed. The period of time during which these switches must operate successively is very short and it is difficult to arrange the controlling mechanism in such manner as to insure the operation of the switches in the proper order and with sufficiently long intervals of time between their operation.

In case the switch for controlling the dynamic braking resistor does not open until the braking circuit is closed, a very heavy rush of current occurs in the armature circuit of the motor and the opening of the switch produces an arc of sufficiently high current value to cause the destruction of the contact members of the switch. The shunt connections of the reversing switches may also be destroyed as a result of the heavy current which traverses the dynamic braking circuit in case the dynamic braking resistor is not inserted in the circuit.

In the system arranged in accordance with my invention, a shunt circuit for the dynamic braking resistor is controlled by a switch that is mechanically connected to one of the reversing switches that is open when the dynamic braking circuit is closed. The dynamic braking resistor is not in circuit with the motor except when the reversing switches are in their respective normal positions for completing the dynamic braking circuit.

By means of the arrangement above described, I am enabled to secure the operation of the several switches in the proper sequence and to insure, also, that the dynamic braking resistor is inserted in the braking circuit simultaneously with the completion of the latter circuit.

In the arrangement constructed in accordance with the prior art, it is necessary to provide two relays for preventing the operation of the reversing switches when the current traversing the dynamic braking circuit exceeds a predetermined value.

In my improved arrangement, a single relay operates in accordance with the value of the current traversing the dynamic braking circuit to prevent the reversal of the motor so long as the current traversing the dynamic braking circuit exceeds a predetermined value. The relay operates to perform this function regardless of the direction of rotation of the motor armature.

Figure 2:
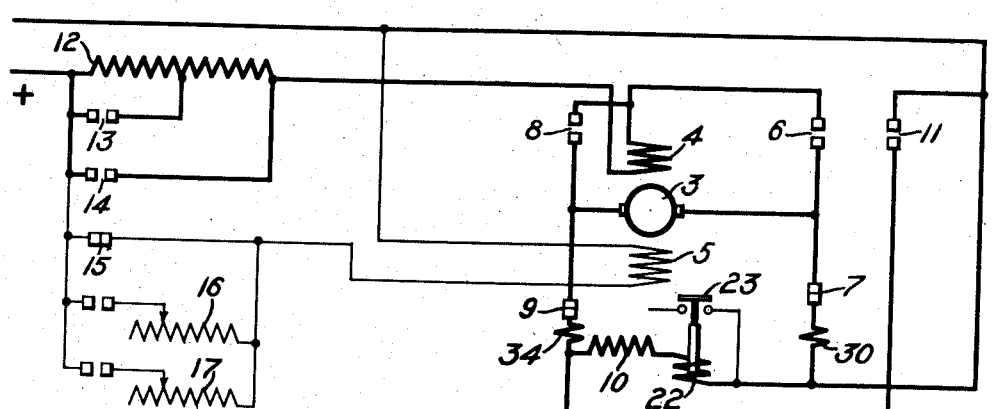

In the accompanying drawing, Figure 1 is a diagrammatic view of circuits and apparatus embodying my invention. Fig. 2 is a schematic arrangement of the main circuits of the system illustrated in Fig. 1. Similar reference numerals are employed to designate corresponding parts throughout the drawing.

Referring particularly to Fig. 1, line conductors 1 and 2 supply current to an electric motor having an armature 3, a series field-magnet winding 4 and a shunt field-magnet winding 5. The circuits of the motor armature are controlled by reversing switches 6, 7, 8 and 9. A shunt circuit for a dynamic-braking resistor 10 is controlled by a switch 11 that is mechanically connected to, but insulated from, the switch 6.

A starting resistor 12 is controlled by electro-magnetically operable switches 13 and 14. A switch 15, that is mechanically connected to the switch 14, controls a shunt circuit for two field rheostats 16 and 17 which may be adjusted for different values and which are connected in circuit in accordance with the direction of rotation of the motor in order that the latter may operate at different speeds in the respective directions. A master switch 18 controls the circuits of the actuating coils for the reversing switches and selectively controls the circuits of the resistors 16 and 17 in accordance with the direction of rotation of the motor armature.

It may be assumed that the motor is stationary and that the several switches occupy their respective positions in which they are illustrated. Under normal conditions, the master switch 18 will occupy the one or the other of its operative positions by reason of the fact that it is arranged to be actuated by the planer bed or other reciprocating part of the driven mechanism. In case the master switch occupies an intermediate position, it may be actuated manually to the one or the other of its operative positions. It may be assumed, by way of example, that the master switch has been actuated to the right, as viewed in Fig. 1.

To start the motor, a push button switch 19 is closed momentarily to complete a circuit which extends from the positive conductor 1, through a resistor 19$^a$, coil 20 of a low-voltage relay 21, push button 19, coil 22 of a relay 23 and conductor 24 to line conductor 2. The low-voltage relay 21 then closes to complete a shunt circuit for the push button 19 and to thereby establish a holding circuit for the coil 20.

The closing of the low-voltage relay 21 completes a circuit which extends from line conductor 1 through conductor 25, contact segments 26 and 27, coil 28, relay 23, low-voltage relay 21, coil 22, and conductor 24 to line conductor 2.

The coil 28 is energized to effect the closing of reversing switch 8 and the opening of reversing switch 9. The armature circuit of the motor, which is completed by the closing of switch 8, extends from line conductor 1, through starting resistor 12, series field-magnet winding 4, switch 8, armature 3, switch 7, holding coil 30, and conductor 24 to line conductor 2. The motor then operates in the direction coresponding to the adjustment of the master switch 18 which may be, for example, the return stroke of a planer.

As the speed of the motor increases, its counter electromotive force increases to a corresponding degree and the actuating coils 32 and 33, which are connected in shunt relation to the motor armature, are energized to effect the succesive closing of switches 13 and 14 for shunting corresponding sections of the resistor 12. The closing of switch 14 effects the opening of switch 15 to remove a shunt circuit for the rheostats 16 and 17. When the master switch 18 occupies the position to which it has been adjusted, the circuit of the resistor 16 is open and the resistor 17 is in circuit with the shunt field-magnet winding 5.

When the planer bed reaches the latter portion of its stroke, the master switch is actuated to the left, as viewed in Fig. 1, to its other operative position. The operation of the master switch opens the circuit of coil 28 and the switch 8 is opened by force of gravity. The operation of the master switch opens the circuits of the actuating coils 32 and 33 and the switches 13 and 14 open to remove the shunt circuit for the resistor 12, and the switch 15 closes a shunt circuit for the resistors 16 and 17. The resultant closing of switch 9, which is mechanically connected to switch 8, completes a dynamic braking circuit for the motor armature which extends from one terminal of the armature 3 through switch 7, coil 30, coil 22 of relay 23, resistor 10, holding coil 34 and switch 9 to the other terminal of the motor armature.

A heavy rush of current traverses the dynamic braking circuit traced above and the motor armature is quickly brought to rest. The relay 23 is maintained in its open position so long as the current traversing the dynamic braking circuit is above a predetermined value at which damage to the motor might occur in case connections are completed for its operation in the opposite direction.

When the dynamic braking current falls below the predetermined value for which the relay 23 is adjusted, the latter closes to complete a circuit through coil 35 and the latter is energized to effect the closing of switches 6 and 11 and the opening of switch 7. The circuit of the motor is then completed for operation in the reverse direction. This circuit extends from line conductor 1, through starting resistor 12, series field-magnet winding 4, switch 6, armature 3, switch 9, coil 34, and switch 11 to line conductor 2.

The closing of switch 11 completes a shunt circuit for the dynamic braking resistor 10 which would otherwise be in circuit with the motor armature in this arrangement of the circuits. The switches 13 and 14 close in the manner described above in connection with the operation of the motor in the first direction.

The opening of switch 15 inserts resistor 16 in circuit with the shunt field-magnet winding 5 to further accelerate the motor. The motor is thus reversed automatically at the end of each stroke of the reciprocating mechanism to which it is operatively connected, and the operation of the machine continues under normal conditions until the circuit of the motor is broken at a suitable line switch (not shown).

The operation of the motor is interrupted automatically upon the occurrence of low-voltage conditions in the source of energy. The motor will not start again upon the return of normal voltage conditions until the push button 19 is actuated to again effect the closing of the low-voltage relay 21 to complete a holding circuit for its actuating coil.

The advantages of a system constructed in accordance with my invention are that the sequence of operation of certain of the switches is insured by their mechanical connection to operate together. It is not possible to complete a dynamic braking circuit for the motor except through the resistor that is normally a part of such circuit. The occurrence of abnormal rushes of current and of destructive arcs at the contact members of the switches is thus avoided.

I am enabled, also, to substitute a single-throw switch for a double-throw switch that is necessary in systems of the same general character as that of my invention as arranged heretofore. This economy is made possible by reason of the fact that one of the line terminals is connected directly to one of the reversing switches and through the braking resistor to another of the reversing switches. The resistor is in the motor circuit only when the reversing switches are arranged for operation of the motor in a certain direction and a shunt circuit for the resistor is necessary only under these conditions.

I claim as my invention:

1. In a motor-control system, the combination with an electric motor, and reversing switches therefor having actuating coils, of a relay for preventing the energization of said coils under predetermined conditions, a no-voltage relay for said coils, a dynamic braking resistor and a switch mechanically connected to one of said reversing switches for controlling a shunt circuit for said resistor.

2. In a motor-control system, the combination with an electric motor and reversing switches therefor having normal positions for completing a local circuit for the armature of said motor and having actuating coils, a resistor in said local circuit, a relay in the circuit of said coils and having an actuating coil in said local circuit, and means comprising a switch for shunting said resistor when said reversing switches are arranged for the rotation of said motor in one direction.

3. In a motor-control system, the combination with an electric motor and reversing switches therefor having normal positions for completing a local circuit for the armature of said motor, a relay for controlling the operation of said reversing switches in accordance with the value of the current traversing said local circuit and having an actuating coil, said circuit comprising said coil and a resistor, and means comprising a switch simultaneously operable with one of said reversing switches for shunting said resistor when said one reversing switch is actuated from its normal position and for removing the shunt when said one reversing switch occupies its normal position.

4. In a motor-control system, the combination with an electric motor and reversing switches for controlling the armature circuit of said motor and each having a stationary and a movable contact member, of a resistor adapted to be connected to one of said contact members of each of said switches, the motor armature being directly connected to said other current members, and means for shunting said resistor when the reversing switches are arranged for the operation of said motor in one direction.

5. In a motor-control system, the combination with an electric motor and two reversing switches therefor, each having a pair of contact members, one contact member of each pair of which is directly connected to the armature of said motor, of a resistor connected to said other contact members which, when closed, complete a dynamic braking circuit for said motor, and a single relay for controlling the operation of said reversing switches in accordance with the value of the current traversing said dynamic braking circuit.

6. In a motor-control system, the combination with an electric motor and two reversing switches therefor, each having a pair of contact members, one contact member of each pair of which is directly connected to the armature of said motor, of a resistor connected to said other contact members which, when closed, complete a dynamic braking circuit for said motor, a single relay for controlling said reversing switches in accordance with the value of the current traversing the dynamic braking circuit, and means for shunting said resistor only when the motor circuits are arranged for operation in a certain direction.

7. In a motor-control system, the combination with an electric motor and two reversing switches therefor, each having a pair of contact members, one contact member of each pair of which is directly connected to the armature of said motor, of a resistor connected to said other contact members, which, when closed, complete a dynamic braking circuit for said motor, a source of energy connected to said other contact members at a point between said resistor and one of said other contact members and to said first contact members, and means for shunting said resistor when two of said contact members are closed.

In testimony whereof I have hereunto subscribed my name this 23 day of May, 1917.

EDWARD I. DEUTSCH.